United States Patent [19]

Robertson

[11] 4,218,407

[45] Aug. 19, 1980

[54] VALVED OR PROGRESSIVELY OPENING SPARGER WITH RIGID UPPER SEAT

[75] Inventor: Louis Robertson, 1411 Nashua Cir., Sun City Center, Fla.

[73] Assignee: Chicago Bridge & Iron Company, Oak Brook, Ill.

[21] Appl. No.: 306,886

[22] Filed: Nov. 15, 1972

Related U.S. Application Data

[63] Continuation of Ser. No. 26,358, Apr. 7, 1970, abandoned.

[51] Int. Cl.$^2$ .............................................. B01F 3/04
[52] U.S. Cl. ............................ 261/64 R; 261/121 R; 261/124; 137/854; 137/856; 137/857; 251/146
[58] Field of Search ................ 137/525.5, 854, 856, 137/857; 251/146; 261/64 R, DIG. 47, 65, 121 R, 124

[56] References Cited

U.S. PATENT DOCUMENTS

| | | | |
|---|---|---|---|
| 939,549 | 11/1909 | Reineking | 137/856 |
| 1,334,507 | 3/1920 | Shartle | 137/525.5 |
| 1,430,119 | 9/1922 | Savery | 261/121 R |
| 1,611,789 | 12/1926 | Spreen | 137/525 |
| 1,707,306 | 4/1929 | Holdsworth | 137/854 |
| 2,106,775 | 2/1938 | Trask | 137/525.5 |
| 2,402,132 | 6/1946 | Goldberg | 261/124 |
| 2,476,320 | 7/1949 | Paulus | 137/525.5 |
| 2,603,465 | 7/1952 | Malzacher | 261/121 R |
| 2,604,296 | 7/1952 | Kehler | 137/854 |
| 2,917,295 | 12/1959 | Hauer | 261/124 |
| 2,986,383 | 5/1961 | Lowry | 261/124 |
| 3,182,978 | 5/1965 | Reilly | 261/124 |
| 3,294,380 | 12/1966 | Born | 261/121 R |
| 3,334,819 | 8/1967 | Olavson | 261/124 |
| 3,339,901 | 9/1967 | Walker | 261/DIG. 47 |
| 3,501,133 | 3/1970 | Dreier et al. | 261/124 |
| 3,568,711 | 3/1971 | Katz | 137/525.5 |
| 3,608,834 | 9/1971 | MacLaren | 261/124 |

FOREIGN PATENT DOCUMENTS

| | | | |
|---|---|---|---|
| 236903 | 11/1962 | Australia | 261/121 R |
| 865415 | 2/1953 | Fed. Rep. of Germany | 137/854 |
| 653749 | 3/1951 | United Kingdom | 137/856 |
| 1210013 | 10/1970 | United Kingdom | 137/854 |

OTHER PUBLICATIONS

"Eimco Type P Non-Clog Diffusers"; Eimco; Salt Lake City, Utah; SM-1059; Sep. 1965, 2 pages.

*Primary Examiner*—Tim R. Miles
*Attorney, Agent, or Firm*—Darbo, Robertson & Vandenburgh

[57] ABSTRACT

A sparger for efficient liberation of air when submerged in a body of liquid comprises a pressure-opened closure biased upwardly to constrict the discharge of air under a rigid annular seat member. Air is thus discharged at an exactly predetermined and constant level. When air is supplied to the interior of the sparger at the lowest volume of flow likely to be desired, it overcomes the bias of the closure and opens the closure, equalizing means ensuring uniform distribution. With different forms, the uniform distribution may be at all points around the periphery of the seat, at selected points, only, or at selected points when the air flow is low, and all around the periphery at high volume. The bias toward closed position may be supplied by the resiliency of the valve, or by buoyancy action, or both. A predetermined back pressure substantially constant through all flow rates can be provided by using buoyancy alone. The equalizing means may be a parallel-movement mounting or movement limiting means. The limiting means may yield for higher air volumes.

5 Claims, 9 Drawing Figures

VALVED OR PROGRESSIVELY OPENING SPARGER WITH RIGID UPPER SEAT

This is a continuation of application Ser. No. 26,358 filed Apr. 7, 1970, now abandoned.

INTRODUCTION

The invention of which this disclosure is offered for public dissemination in the event that adequate patent protection is available relates to a sparger for liberating gas, usually air, in the treatment of sewage. In sewage treatment by various versions of the activated sludge process, air is liberated deep in a tank, serving both to stir the contents of the tank and to aerate the contents of the tank. Porous diffusers were standard for many years but were subject to severe clogging problems. They continued to be used, however, because of the efficiency achieved by finebubble liberation until the industry was taught by Walker (U.S. Pat. No. 3,153,682) that acceptable efficiency could also be achieved with large bubble liberation if the air was liberated around spargers in a manner to form concentrated air-lift columns, one above each sparger, which were so vigorous as to break up the large bubbles into fine bubbles. Efficiency is essential because the cost of pumping air is a large part of the cost of operating a sewage treatment plant. The original Walker sparger had four constantly open orifices spaced evenly around the periphery. More recently a large auxiliary orifice at a lower level has been added to discharge much greater air volume with only mild increase in back pressure.

Since the original Walker sparger there have been various proposals for different forms of sparger, one popular idea being to have a valving sparger such that upon discontinuance of the supply of air, the sparger would seal itself and not let the surrounding sludge enter the air supply system. In spite of the desire for valving, the valved devices proposed have not proved popular. Possible reasons were that their sealing action was not sufficiently dependable and that their distribution of air was not sufficiently uniform around the sparger. There appears to have been erratic and sometimes excessive movement of the valve in opening under influence of the air pressure.

According to the present invention, the erratic and excessive effects of valve opening are considerably reduced or eliminated. In part this is accomplished by placing the fixed valve seat above instead of below, the movable valve. This simple change alone aids in two ways. First, the air always must escape from under an immovable surface which is quite level so that the air does not have more tendency to flow from one side than from the other. Second, the movable valve opens against increasing hydrostatic pressure, and this gives greater stability than in prior practice under which, if one side of the valve opened first it would then have less hydrostatic opposition to opening wider, i.e., too wide. To cooperate with this immovable upper valve seat, the valve member is biased upwardly for closing, and biased with enough force so that moderate back pressure, pressure above the hydrostatic pressure at the level of liberation, is maintained. Preferably, means is provided to ensure that the valve will open uniformly peripherally.

According to another aspect of the invention, more progress is made in achieving efficiency with a wide range of air flow rates. Some forms of the present invention substantially eliminate increase of back pressure at the discharge point by enlarging the main discharge orifice as much as is required to maintain the back pressure at a predetermined level. All preferred forms permit increasing the orifice size at the one chosen level, while dependably retaining an adequate distribution pattern to ensure the proper air lift column effect.

Additional advantages and objects of the invention will be apparent from the following description and from the drawings.

DESIGNATION OF FIGURES

BACKGROUND DESCRIPTION

Figure 2:
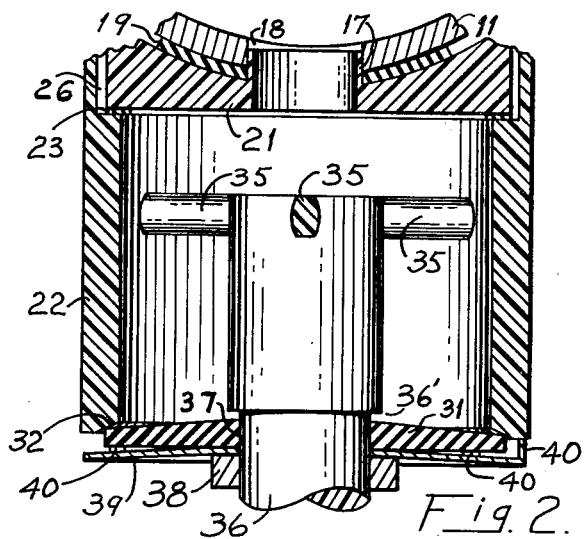
FIG. 2 is an enlarged vertical sectional view through the valved sparger of FIG. 1.

For about the past decade the preferred practice for aerating sewage has been to use horizontally extending headers 11 supplying air to spaced spargers 12 (though different from these) secured to the headers 11. Before the present invention, it had already been found best to secure the spargers 12 at the bottom sides of the headers so that the headers could be fully drained through them, and to use a spring-mounting device comprising a strap 13 and a pair of springs 14 for securing the sparger in place. The sparger could be either a single sparger located directly under the header 11 or it could be a double sparger having two arms extending laterally so that a series of such devices would provide two lines of spargers. The present drawings illustrate only single spargers but the invention can also be used for double spargers. Proper positioning of the spargers on the header has been ensured by a boss 17 (as seen in FIG. 2) extending up into the aperture 18 of the header 11 and snugly fitting it. A gasket 19 has been provided to form a seal between the header 11 and the saddle portion 21 of the sparger. In the case of single spargers the saddle portion 21 has been a separate piece set into the main sparger body 22 and sealed to it with a gasket 23. Proper alignment of the saddle portion 21 with the body 22, and especially with its attachment arms 15, has been ensured by an interfitting of projecting lugs 26 formed on the sparger body 22 and notches in saddle portion 21 snugly fitting the lugs 26.

In the past the sparger most nearly resembling the present sparger body 22 has been provided with four apertures evenly spaced around the body near the bottom edge thereof. The level chosen for these apertures, well below the header 11, was chosen so as to permit intermixing with double spargers in which the arms were downwardly sloping for drainage purposes, their apertures therefore being well below the header 11. The present sparger may be dimensioned (except FIG. 4) to liberate air at the same level for compatability with these others.

When the Walker sparger was first introduced, trouble was occasionally encountered due to the entry of sludge into the air supply system every time the gas supply was discontinued. Although Walker largely solved this problem by providing blow-off legs (U.S. Pat. No. 3,242,072), efforts were mady by others to use a separate class of spargers which could be called valved spargers. These were intended to be self closing when the air was shut off, so as to keep the surrounding sludge liquor from entering the air system. Because the first valves were in the form of disks, these may be called disk spargers. The term "sparger" may be questionable in this use, because these devices did not have a series of apertures. They were expected to provide an equivalent effect in uniform distribution of air by providing a circumferential narrow slot upon opening, but they were not reliable in doing this.

RIGID AIR RELEASE SURFACES OF PRESENT INVENTION

Although there may or may not still be a need for valved spargers, depending on whether all of the troubles have now been overcome by recent developments in the downwardly mounted spargers, there may still be some engineers designing sewage treatment plants who would prefer valved spargers. Most forms of the present invention are designed to provide such spargers while overcoming or minimizing faults of prior valved spargers.

According to the present invention, the fixed surfaces with respect to which the movable valve members cooperate are mounted uppermost. Thus in FIG. 2, the valve body 22 is above the valving member or closure 31. In this instance the body 22 provides a downwardly facing seat 32 against which the valving member 31 is biased. When the valving member 31 is opened by air pressure, the seat 32, which remains rigidly positioned, determines with exactitude the level in the water at which the air is released. With prior disk spargers, the valve opened upwardly and hence served as the air release surface, the surface from beneath which the air would escape. Since this surface was movable, there was no certainty that air would be released at exactly the same level on all sides of one disk, nor at all spargers. The air escaping from under the higher release surface would encounter less hydrostatic pressure and this would contribute to lack of uniformity in the distribution of the air flow. Furthermore, the raised side of a disk would have less water pressure above it than the lower side, encouraging the continuation of this erroneous positioning.

In all preferred forms of the present invention, the air is released from under a fixed air liberation surface so that with proper mounting all release points are at the same level, and stay that way. The preferred forms also are constructed to ensure satisfactory air distribution.

Figure 1:
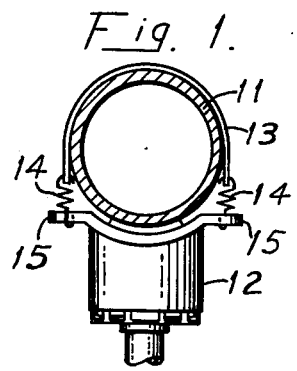
FIG. 1 is a vertical sectional view through a header, showing one form of valved sparger mounted thereon.
Figure 4:
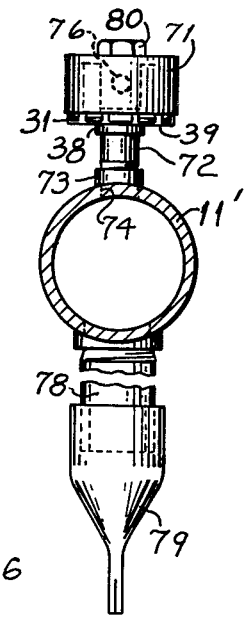
FIG. 4 is a view similar to FIG. 1, but showing a top-mounted form of the invention.
Figure 3:
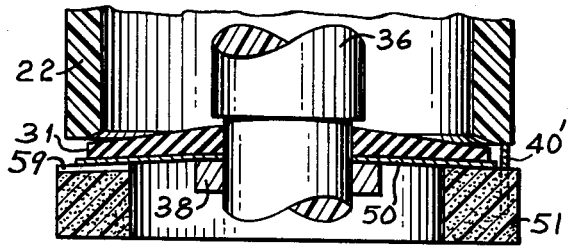
FIG. 3 is a fragmentary view corresponding to FIG. 2A but showing equalizing means, or limiting secondary bias, in the form of a float.

Preferably the valving member is provided with a substantial bias. To distinguish from the bias the water pressure provides, the term structural bias may be used, the valving member being part of the structure. By having it open only when the internal air pressure is substantially higher than that of the surrounding water at the liberation level, some advantages are achieved. In the structure of FIGS. 2, 3 and 4, the strength of the bias can be adjusted during manufacture. Thus in FIG. 2, the plastic body 22 is molded with a valve receiving post 36 centrally supported by legs 35, three legs being the present preference. The valve closing bias of the valving member or closure 31, which may be of Neoprene or other elastomer, is determined by the position of its hub 37 vertically on the post 36. This positioning could be made uniform during manufacture, or could easily be set for each device to provide a predetermined biasing pressure accurately. This may be standard or may be chosen for each installation depending on the expected minimum air flow. One way to accomplish accuracy would be to turn the sparger upside down during assembly, apply cement to the inner diameters of hub 37 and to the corresponding portion of post 36, slip the valve 31 onto the post 36, and apply over them a given weight, resting on the hub 37 adjacent to the post 36, so that it would move the hub 37 further onto the post 36, until that bias represented by the weight had been achieved.

A limiting shoulder 36' on post 36 can be provided. A manufacturer who decides not to use the above described system of adjusting to a given bias can position the shoulder 36' somewhat lower than it is shown and simply press the valving hub 37 against the shoulder 36' for uniform positioning of the hubs.

EQUALIZATION BY SECONDARY BIAS

Figure 2A:
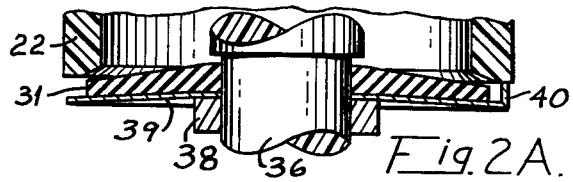
FIGS. 2A and 2B are fragmentary views of the structure of FIG. 2 with the valve in successive open positions.
Figure 2B:
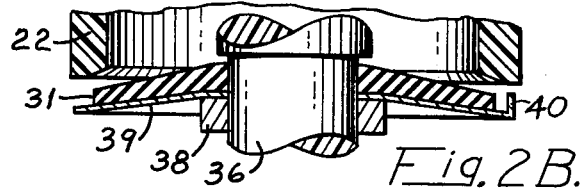

A cause of inadequacy of prior valved spargers has apparently been failure to achieve peripheral uniformity in the distribution of air. On analysis, it is found that the height of the peripheral opening should be quite small, in the range of 0.01 or 0.02 inch. This means that very slight variations have a pronounced effect in destroying uniformity. According to the present invention, equalizing means is provided, if needed.

in FIG. 2 the equalizing means is a disk or cage 39, the periphery of which is accurately positioned to permit exactly the predetermined small movement of the periphery of closure 31, as seen in FIG. 2A. Accuracy can be achieved by a series of legs 40 resting on the lip of body 22. Limits of valving movement have been provided heretofore, but so far as known they have all permitted too much movement. Unless the total orifice is sufficiently constricted to develop moderate back pressure due to flow through the orifice, the air will flow unpredictably, and uniform distribution would be a happy accident. At lower air volumes sometimes used a valve movement of a mere 1/16 inch might be three times too much!.

The cage 39 can be rigid and non-yielding. According to another feature of the invention, it is resilient and yields (FIGS. 2 and 3) to a moderate back pressure, so that increased air flow is permitted without requiring much increase in pumping pressure. It can be set to the desired preloading (amount of bias when resting on body 22) by flexing its hub to a chosen position jointly with closure 31 or separately.

At this time there is no certainty that cage 39 will yield so uniformly as to maintain peripheral uniformity of air distribution. A recent Dreier and Walker patent application indicates that this is not necessary, so long as there is at least a sufficient distribution to ensure the vigorous air-lift column taught by Walker U.S. Pat. No. 3,153,682. This is safely achieved by making cage 39 strong enough not to yield until there is a sufficiently voluminous air flow to establish that vigorous air-lift column, distribution being safely uniform at this volume of flow because cage 39 ensures it.

VALVE BIAS BY BUOYANCY

As illustrated in FIG. 3, the secondary bias can be provided by buoyancy. Here the cage includes a buoyant annulus 51, illustrated as a foam material. If a cellular material is used, the cells are unbroken and preferably a surface skin is provided, and a rigid material is used so as not to be compressed by the water pressure.

Annulus 51 may be carried by a disk 50. Preferably this disk is freely flexible, substantially without resilience or elasticity, as fabric or a thin plastic sheet. The incremental bias supplied by the annular float is thus quite sure to be peripherally uniform. Closure 31 is the same as in FIG. 2 and has its own resilient bias. Distribution of adequate flow is again ensured by accurate positioning of the limiting means 51, achieved by a series of spacers resting on body 22. In this instance the spacers 40' are shown embedded in body 51.

Figure 5:
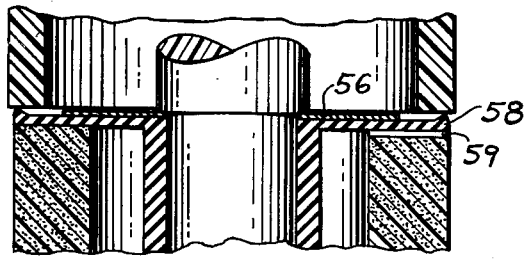
FIG. 5 is a view of another modification of the invention in which substantially all of the valve closing bias is provided by buoyancy, which is constructed to ensure parallel movement, and which provides relatively constant sparger back pressure.

In FIG. 5, the float 52 is of much larger volume, the volume being chosen such that the desired amount of valve closing bias would be provided by its buoyancy alone. Accordingly the flexible webs 56 and 57 are not intended to provide any valve closing bias. Indeed, without surrounding liquid the valve portions might droop downwardly, thus opening the valve. Relying entirely on the buoyancy action is a relatively sure way to provide great uniformity of the biasing action, both as between spargers on an accurately horizontal (level) header and as to the peripheral distribution of the uniform bias. When good uniformity of bias is achieved, in this way or by great care with resilient biasing, the increased hydrostatic pressure encountered as valves open downwardly may be a significant aid toward achieving uniformity in the opening action. The space within annulus 52 should be allowed to fill with water. Bleed holes 59 may be provided. Lower disk 58 and web 57 could be quite open. For example, they could be spoked. A vent 59 is similarly shown in FIG. 3.

PARALLEL MOVEMENT VALVE ACTION

The structure shown in FIG. 5 is also designed to ensure peripherally uniform opening of the valve by a "parallel movement" or "pantograph" type of action. Tests indicate that without this, the opening action is likely to be very uneven. Each of the webs 56 and 57 is reinforced by (or consists of) a freely flexible substantially nonelastic disk 58. These disks may be vulcanized within the elastomer webs 56 and 57 though they have been shown externally cemented. Because these disks 58 are substantially nonelastic, they maintain the buoyancy annulus 52 (which serves as a rigid liking member between the webs) constantly centered with respect to the axis of post 36' at both the top and bottom faces of annulus 52. This confines movement of annulus 52 to movement parallel to the post 36, i.e. axially thereof. This ensures that the opening of the valve will be peripherally uniform.

UNIFORMITY AND VARIABLE FLOW WITH CHOSEN BACK PRESSURE

Figure 6:
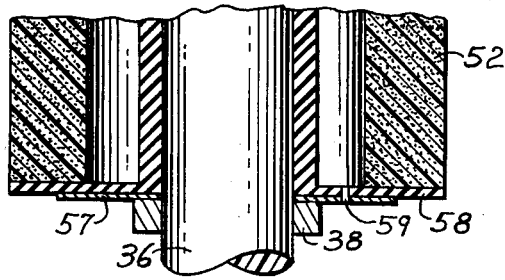
FIG. 6 is a fragmentary sectional view of still another form of the invention in which the valving action progressively opens separated ports, the bias and parallel action and pressure constancy being substantially as in FIG. 5.
Figure 6:
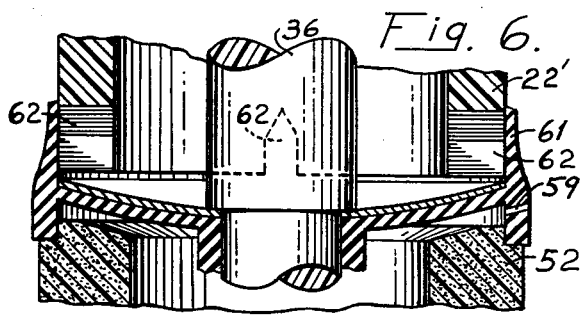

When the valve closing bias is supplied entirely by buoyancy as in FIGS. 5 and 6, the bias pressure can be chosen to provide almost exactly a predetermined back pressure, regardless of the volume of air flow, throughout a wide range of possible air flow rates. Thus in each instance, the minimum expected flow will overcome the buoyancy of annulus 52 and move it downwardly, but as soon as the valve opens enough to permit this minimum volume of flow at the predetermined back pressure, the air flow will stabilize at that pressure and the annulus 52 will remain at the level which provides this back pressure. If the sewage plant loading should increase and more air be required, the additional air flow would press the annulus 52 just enough lower to again stabilize the air flow at substantially the same original predetermined back pressure. It would be increased only by the increase in hydrostatic pressure to be overcome, resulting from the slight downward movement of the movable structure. From the pumping and power-required standpoints this increase is negligible, even though it is enough to help achieve acceptable equality of flow as between different spargers supplied with equality of line losses. However, in the more usual cases where there are unequal line losses, forms such as FIG. 2, producing higher back pressures, are preferred.

PERIPHERALLY SPACED RELEASE POINTS

Because there have been very satisfactory results with 4-orifice spargers, and these results do not seem to have been achieved heretofore with release through a peripheral slot, some engineers designing sewage treatment plants may be reluctant to use anything except a sparger with distributed restrictive orifices. FIG. 6 provides a valved sparger of the 4-orifice nature. In this instance the elastomer valve 61 is of a sleeve valve type, sliding externally along a seat formed by lower portion of sparger body 22'. Thus valve 61 opens and closes slots 62, of which four is the present preferred number, uniformly spaced around the periphery of the sparger body 22'. The buoyancy annulus 52 may be mounted with the parallel movement type of mounting as in FIG. 5. When the pressure is sufficient to overcome the buoyancy of the annulus 52, the sleeve valve 61 will be lowered by the air pressure, opening the slots 62. The amount of opening of the slots 62 will be only enough to release the total volume of air supplied while maintaining the back pressure sufficient to hold the annulus 52 from rising by buoyancy. The tops of the orifices 62 will form the downwardly facing fixed air release surfaces previously discussed, although in this instance they will be at separated points instead of being continuous peripherally.

Because air is liberated only through narrow slots 62, valve 61 will have much greater movement than in FIG. 5, making minute inequalities less significant. Accordingly experience may show that the parallel movement means is not needed.

This type of valve is not at present recommended for most uses of aeration, because the sliding action is not likely to work well, especially as to closing, after long usage.

Figure 7:
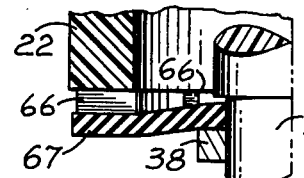
FIG. 7 is a simplified form usable when valve sealing is not desired, the "closed" position of the valve positioning a uniform pattern of distribution through short-tube orifices.

A very simple and more universally usable form of the invention using peripherally spaced release points is shown in FIG. 7 (one side of the center line only). Here orifices 66 are open even when closure 67 is in its "closed" position. Closure 67 in a preloaded condition, i.e. it is self-biased firmly enough so that it does not begin to open until the air flow is of high enough volume to establish the necessary vigorous air lift column. Before valve 67 opens, uniform distribution of air is ensured by uniform spacing of uniform orifices around the periphery. In fact the orifices are of short tube nature which the Walker sparger has proved to be suitable, and there may be just four of them, although a different spacing is chosen in the drawing for visibility. The orifices 66 may be in the body 22 instead of in closure 67. In fact, they could be provided a little above the lip of the FIG. 2 structure, the closure 31 then being biased strongly enough not to open until enough air flows through such orifices to establish the vigorous air lift pattern.

As soon as a greater air flow forces the closure 67 to "crack open", or closure 31 in modified FIG. 2, uniformity in the incremental flow may be uncertain (or is still unproved) but at least the necessary column-inducing flow continues through all orifices 66.

DRAINAGE UPON RESUPPLY OF AIR

The FIG. 7 form does not provide sealing against inflow of sludge when air is not supplied which some engineers may want. However, sealing may be unimportant for this and some other illustrated forms of the invention which provide complete drainage of the sludge when air is resupplied. It is not believed most engineers will insist on sealing when it has not heretofore been dependable anyway. One contribution toward good drainage is that the closures 31 and 67 slope downwardly toward their peripheries (where orifices are located or will appear when air supply is resumed). The FIG. 5 form would slope similarly when open after air is resupplied. Although gravity alone would leave a small pool in sleeve valve 61 of FIG. 6, the air is expected to blow all or nearly all of this pool out through the orifices 62.

TOP MOUNTED SPARGER

Although it is at present preferred to mount spargers on the bottoms of the headers, some basic features of the invention can be used in top mounted spargers as seen in FIG. 7. In fact, any one of the features would improve prior valved spargers. In FIG. 4 a cap-shaped sparger body 71 is provided with a downwardly extending mounting nipple 72, pipe-threaded at its lower end to screw into a fitting 73 welded to the top of the header 11', and surrounding an aperture 74. The nipple 72 discharges air from header 11' through apertures 76 to the inside of cap 71. Valving member 31 and secondary bias equalizer 39 may be substantially the same as in FIG. 2.

With top mounted spargers, it is very desirable to provide for drainage of the headers 11' as by downwardly extending tubes 78. If there is hope of excluding sludge from the air system, these can be provided with valves 79 which open readily if internal pressure exceeds the surrounding pressure.

Even if tube 78 is left open at its bottom end, so that the self sealing effect of valve 31 is of no consequence, this form is greatly preferred over prior valved spargers or the like because the air is still released under a fixed downwardly facing surface, and the equalizing means 39 has the same advantages, as in FIG. 2.

The cap 71 and post 72 may be molded of plastic, formed of metal as a casting, or fabricated. They can be saddle mounted instead of pipe-threaded mounted, but if pipe-thread mounting is used, the cap 71 is provided with a hex head 79 on top thereof.

FURTHER DETAILS

In most forms of the invention the valving member engages the seat along a thin line at the extreme outer periphery of the valving member. In this way, substantially the same area of the valving member is exposed to the air pressure, whether the valve is seated or has been forced open. The spreading exposure of prior valves has contributed to their erratic behavior. It must be expected that a valve will first "crack open" at some one point. If additional surrounding area is then exposed the "crack" is widened enough to reduce pressure elsewhere and delay opening at remote points.

Also the preferred thin line contact is believed to give the most reliable sealing effect.

The buoyant or cellular pieces 51 and 52 may be made in the form of hollow floats of metal or hard plastic. Because of their cylindrical shape, such materials will safely withstand the pressures.

At present it is desired that the vertical dimension of the float 52 be at least equal to its outside diameter for reliability in providing the parallel movement valve action. The preferred outside diameter for all of the spargers is at present three inches, this dimension having been very extensively used in successful spargers. The correct biasing force may be provided by suitably choosing the horizontal dimensions.

Inasmuch as experience with prior successful spargers has indicated that a back pressure from the orifice equivalent to six inches of water column is desirable to give uniformity as between different spargers along a header, it is at present preferred that the biasing of the valve members ordinarily be such that they will not open with much less net pressure than this, i.e., less than this in excess of external pressure. However, back pressure greater than necessary represents lost power. Even where there is no header distribution problem the back pressure should be enough to reliably prevent the surrounding water from creeping into the orifice formed by the opening valve. For this reason it is believed that it would be unwise to let the back pressure on minimum opening of the valve be less than that represented by two inches of water column.

The sparger units, such as body 22 with its post 36, are preferably molded of a strong slick surface plastic material to which foreign bodies do not adhere readily. The material at present preferred by one manufacturer is acrylonitrile-butadiene-styrene polymer, sold commercially as "Cycolac", grade E being a suitable quality. The closures such as closure 31 can also be molded of plastics less elastic than those known as elastomers. The shapes will of course be chosen to be suitable for the material used. The tapers and thicknesses in the drawings are merely illustrative. However, as is evident from the drawings, and as in accordance with intentions of prior practice in valved disc-spargers, closures such as 31 are shaped about a central mounting thereof with uniformity of contour about its center. Such uniformity of contour about a central point is appropriate for peripheral near-uniformity of yieldability of the valve member to pressure within the sparger, although this alone is not enough to achieve uniform movement.

The mounting post 36 can very easily provide a downwardly extending discharge passage, if desired, by being made tubular. This tube may be provided with a valve such as valve 79 of FIG. 4. In this event, it will not let sewage enter the air system during discontinuance of air supply. If not too far below the seat 32, it would let air be discharged if at any extreme air flow requirements the closure such as 31 did not permit the desired flow more easily.

In view of experience believed to have been encountered with disk spargers, it is not safe to assume that the sealing of the air system during discontinued air supply will be entirely reliable through years of service. Recognizing therefore that the surrounding sludge liquor may find its way into the air supply system and seek its own level therein, the tubular post 36 could also serve as the main discharge for sludge upon resumption of air supply. Being aligned with the boss 17 and having an internal diameter at least as large, it can be expected that sludge jetting through the boss 17 will largely continue downwardly through tubular posts 36, pressing the valve 79 wide open to permit the flow.

The tops of orifice slots 62 are gable shaped so valve sleeve 61 will not catch in closing. There must be recognition, nevertheless, that slimes or other accretions may, after a time, interfere with the closing of any form having sliding action on surfaces normally wet. The other forms are therefore preferred at least in most uses.

ACHIEVEMENT

The preferred valved spargers of the present invention are superior to those of the past, in regard to (1) sufficient uniformity of distribution of air along the periphery of each sparger to achieve proper air-lift columns for efficient aeration, (2) reliability of sealing when the supply of air is discontinued, (3) drainage after resumption if sludge has entered, and (4) suitability for a wide range of air flow volumes. Each the simplest forms of the invention such as body 22 or cap 71 with its closure 31 (no disk 39) is distinctly superior to past known spargers valved by upwardly-opening closures.

Experiments made without providing limiting means such as cage 39 have indicated erratic opening of a flexible valving member. The preferred forms of this invention, especially with cage 39, are expected not to give trouble due to this tendency. If this tendency is found troublesome with any form of this invention, the trouble can be reduced by mounting on posts 36 a fixed annular deflector above the valving member to protect the valving member from the momentum of the approaching air. Ideally, this should provide a balance between the effects of momentum and of pressure reduction by the flow of gas (Bernoulli effect). To this end, the underside of the deflector may be vented to a point of desired or average pressure.

I claim:

1. In a tank containing a body of liquid, and means for supporting therein a sparger submerged in said body of liquid, a valved sparger supported by said means, and including a rigid peripheral seat and a valve member having its periphery movable to close with respect to the seat, said movable valve periphery being so located as to be exposed during normal operation to the body of liquid while determining the distribution of air release about the sparger, characterized by:
   said valving member having, at a selected minimum airflow volume which is appropriate for establishing above the sparger a vigorous air-lift column to break up bubbles therein to fine bubbles, a position at which the total effective orifice area is constricted to provide a back pressure equivalent to at least two inches of water column;
   said sparger including yieldable stop means initially engaged by the valving member when it has opened to said position and preloaded to induce substantial equality of distribution of said orifice area about the seat before yielding to provide an increase of said area to accommodate greater flow with only moderate increase of the air pressure immediately upstream from the orifice area.

2. In a tank containing a body of liquid, and means for supporting therein a sparger submerged in said body of liquid, a valved sparger supported by said means, and including a rigid peripheral seat and a valve member having its periphery movable to close with respect to the seat, said movable valve periphery being so located as to be exposed during normal operation to the body of liquid while determining the distribution of air release about the sparger, characterized by:
   a yieldable stop means which in its initial position rests at its periphery on the seat but has a slight clearance from the valving member throughout their peripheries; the clearance being such that at a selected minimum air-flow volume which is appropriate for establishing above the sparger a vigorous air-lift column to break up bubbles therein to fine bubbles, the total effective orifice area provided by the valve when moved off of the seat and uniformly engaging the stop means in said initial position is constricted to provide a back pressure equivalent to at least two inches of water column;
   and means for applying a preloading force to the stop means to provide an initial contact pressure against the seat such that before yielding, the stop means will induce said back pressure and induce substantial equality of distribution of said orifice about the seat; and said stop means being yieldable to provide an increase of said area to accommodate greater flow with only moderate increase of air pressure immediately upstream from the orifice.

3. A sparger including a body having a fitting for mounting on a supply pipe and for passage of a gas supply from the pipe to the body, and having a generally circular valve seat substantially at its periphery to be exposed during normal use to liquid in which the sparger may be submerged; a generally circular valve adapted to seat all along its periphery on the valve seat to close the body against entry of surrounding liquid when gas is not being discharged; said fitting being suitable for the supply of gas at a volumetric flow rate greater than that which is a minimum sufficient rate when the gas is discharged around said seat into liquid, for producing a vigorous air-lift column in liquid above the sparger;
   and a resilient stop engaging the body at points surrounding the periphery of the valve to be spaced with a peripherally uniform clearance beyond said valve periphery from the seat to allow said valve periphery to move from the seat; said stop engaging the seat with a preload pressure which resists separation of the stop from the seat until the initial opening of the valve with peripheral uniformity as permitted by said clearance yields a back pressure, at said minimum sufficient rate, at least equal to a two-inch water column; and said stop yielding for a greater opening of the valve and a greater flow rate at a moderately higher back pressure.

4. A sparger including a body having a fitting for mounting on a supply pipe and for passage of a gas supply from the pipe to the body, and having a generally circular valve seat substantially at its periphery to be exposed during normal use to liquid in which the sparger may be submerged; a generally circular valve adapted to seat all along its periphery on the valve seat to close the body against entry of surrounding liquid when gas is not being discharged; said fitting being suitable for the supply of gas at a volumetric flow rate greater than that which is a minimum sufficient rate when the gas is discharged around said seat into liquid, for producing a vigorous air-lift column in liquid above the sparger;

and mechanical means for ensuring that movement of the valve from the seat will be peripherally uniform; said mechanical means including a guide web centrally anchored at a point spaced substantially from the valve, and at peripheral points linked to the valve periphery with a linkage member of substantially rigid cylindrical nature; said valve having a centrally anchored web cooperating with said guide web to confine movement of the valve periphery and linkage member to movement generally perpendicular to the plane of the valve seat.

5. A sparger including a body having a fitting for mounting on a supply pipe and for passage of a gas supply from the pipe to the body, and having a generally circular valve seat substantially at its periphery to be exposed during normal use to liquid in which the sparger may be submerged; a generally circular valve adapted to seat all along its periphery on the valve seat to close the body against entry of surrounding liquid when gas is not being discharged; said fitting being suitable for the supply of gas at a volumetric flow rate as great as that which is a minimum sufficient rate when the gas is discharged around said seat into liquid, for producing a vigorous air-lift column in liquid above the sparger;

and a stop spaced with a peripherally uniform clearance beyond said valve periphery from the seat to allow said valve periphery to move from the seat; said stop having a firmness of positioning to resist further separation from the seat at least until the initial opening of the valve with peripheral uniformity as permitted by said clearance yields a back pressure, at said minimum sufficient rate, at least equal to a two-inch water column.

* * * * *

UNITED STATES PATENT AND TRADEMARK OFFICE
CERTIFICATE OF CORRECTION

PATENT NO. : 4,218,407
DATED : August 19, 1980
INVENTOR(S) : Louis Robertson

It is certified that error appears in the above-identified patent and that said Letters Patent are hereby corrected as shown below:

In column 2, lines 36 and 37, change "positioning" to "providing".
In column 3, line 17, change "mady" to "made".
In Column 5, in the line appearing 2 lines below the line-number 60 change "liking" to "linking".
In column 7, in the line at line-number 45, change "7" to "4".
In column 7, bottom line, change "pipe-threaded" to "pipe-thread".

Signed and Sealed this

Sixteenth Day of December 1980

[SEAL]

Attest:

SIDNEY A. DIAMOND

Attesting Officer

Commissioner of Patents and Trademarks